Jan. 9, 1968   KATASHI AOKI   3,363,040
APPARATUS AND PROCESS FOR INJECTION MOLDING A PLASTIC TRAY
Filed Oct. 11, 1966   3 Sheets-Sheet 1

INVENTOR
KATASHI AOKI
BY
OSTROLENK, FABER, GERB & SOFFEN
ATTORNEYS

United States Patent Office 3,363,040
Patented Jan. 9, 1968

3,363,040
APPARATUS AND PROCESS FOR INJECTION MOLDING A PLASTIC TRAY
Katashi Aoki, 6037 Oaza Nanjo, Sakaki-machi, Hanishino-gun, Nagano-ken, Japan
Filed Oct. 11, 1966, Ser. No. 585,947
Claims priority, application Japan, Oct. 12, 1965, 40/62,516
2 Claims. (Cl. 264—278)

ABSTRACT OF THE DISCLOSURE

An apparatus for and method of partially encapsulating a rigid plate with a thermoplastic material to form a tray or the like. The plate is held against the upper surface of an injection mold by spring loaded mold pins. When the molten plastic is injected into the mold, the pressure of the injected material forces the plastic against the upper surface of the mold and drives the pins out of the molding cavity and down into the base of the mold forming an additional cavity into which the molding plastic then flows. Upon removal of the upper movable mold, the compressed springs make the mold pins eject the finished article from the mold.

---

This invention relates to synthetic plastics decorated trays and their injection molding method.

The tray of this invention is provided with a decorative plate on its bottom portion being held tightly by a frame and the bottom of the tray. The body of the tray is made of thermoplastic materials such as polyethylene, polypropylene, polyvinyl chloride, polystyrene and so forth. The decorative plate of the tray consists of a protective plate which is transparent of semitransparent and coloured or not coloured and a pattern plate consists of pictures, writings, patterns or any of other suitable things. The protective plate of the decorative plate may be omitted where the pattern plate is durable material such as a board or a metal plate. The pattern plate of this invention is held tightly on its periphery by the frame of the tray and is free from moisture, water, scratching or any of other injuries in case of the protective plate being applied. So that the pattern plate can be preserved well as it is for a long period.

Further, if a lenticular screen is applied for the decorative plate of the tray, stereoscopic pictures can be fitted on the tray.

The above-mentioned decorative tray can be utilized for a plate, a dish, a platter, a bowl, a server tray, a table board, a hand-mirror, a wallboard, a tile, a framed picture, a pen tray, an ash tray and the like by changing the shape of the tray body and the frame portion.

Further this invention provides an injection molding method of the aforementioned decorated tray which will be explained on the basis of the accompanying drawings in which:

FIG. 4–FIG. 6 are explanatory diagrams of the injection molding method of this invention in which, FIG. 4 is a horizontal front view of a stationary mold.

FIG. 5 is a vertical sectional view of a set of halves of a stationary mold and a movable mold, which is applied a decorative plate in the cavity; and FIG. 6 is a vertical sectional view of the set of the molds which has been injected plastics material in the cavity.

Figure 1:
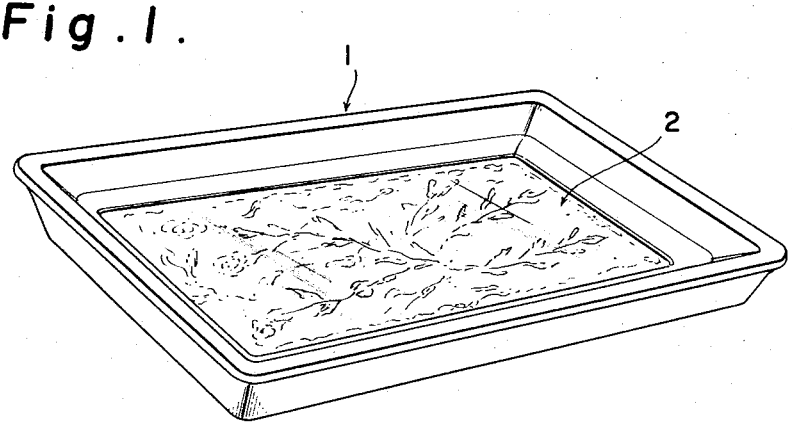
FIG. 1 is a perspective view of an embodiment of a synthetic plastics tray of this invention.
Figure 2:
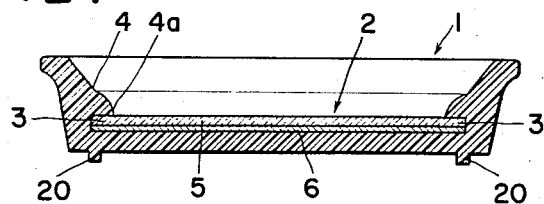
FIG. 2 is a vertical sectional view of the said tray.
Figure 3:
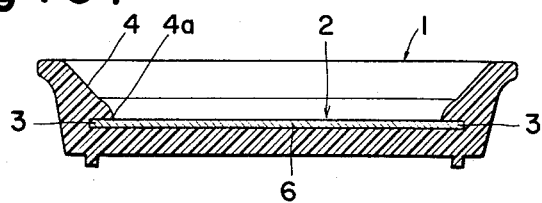
FIG. 3 is a vertical sectional view of the tray to which is applied no protective plate.

In FIG. 2, a decorative plate 2 is fitted on the bottom portion of the framed tray body 1 in the state of greater part of the decorative plate surface being exposed. The decorative plate consists of a protective plate 5 which is transparent or semitransparent, coloured or not coloured and patterned or not patterned and a pattern plate 6 which is applied pictures, writings, patterns, boards, metal plates, etchings, cloths, laces, herbariums or any other suitable materials. In case of the pattern plate 6 is a soft material such as a cloth or a lace, it may be applied with a suitable base sheet. In case of the pattern plate 6 being durable material such as a board, a metal plate or a thermostable plastics plate, the protective plate 5 can be optionally excluded as shown in FIG. 3.

Figure 4:
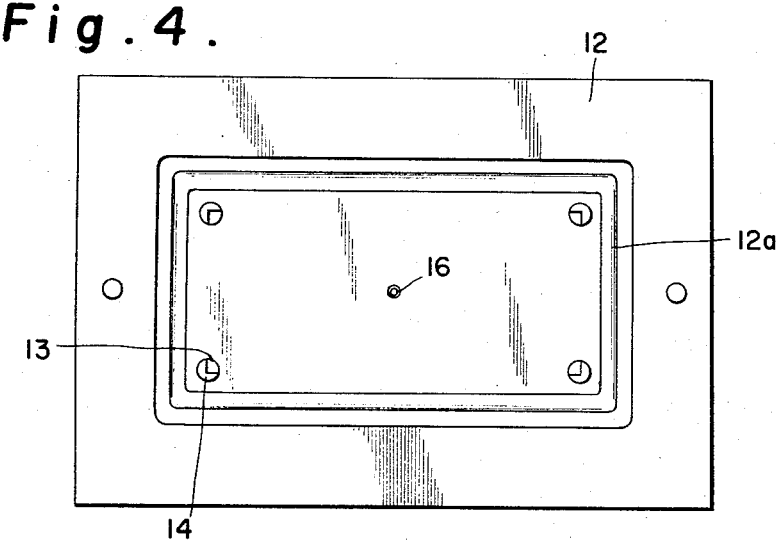
Figure 5:
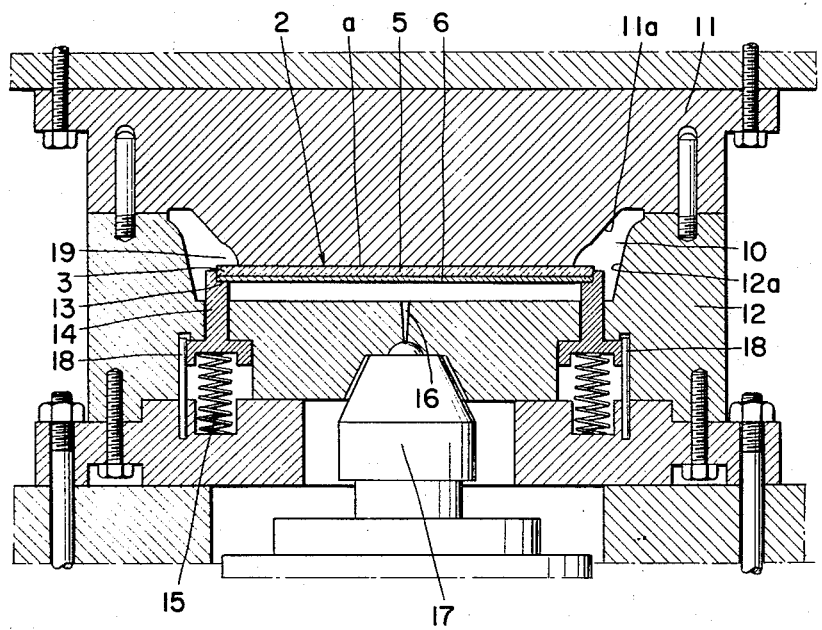
Figure 6:
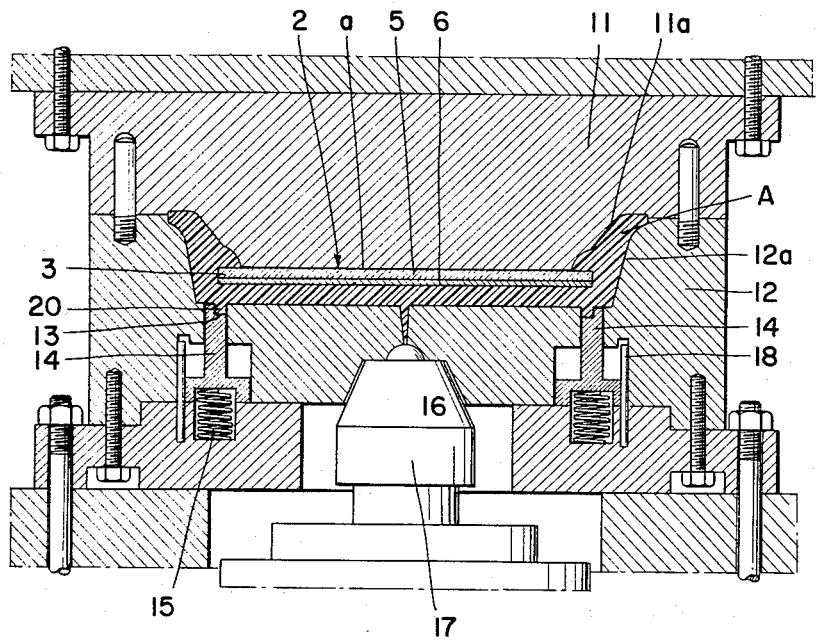

In the following, the injection molding method of this invention will be explained in accordance with FIG. 4 to FIG. 6.

The cavity 10 which forms the shape of the tray body 1 is resulted by adjoining the stationary mold 12 and the movable mold 11. The movable mold 11 has a mold surface 11a which conforms to the shape of inside wall 4 of the tray body 1, and the stationary mold 12 has mold surface 12a which conforms to the outer shape of the tray body 1. Pins 14 are provided at the outside portion of the inside edge 4a of the tray body 1 on the mold surface of the stationary mold 12. The said pins 14 are pushed upwards by coil springs 15 and optionally provided with fan shaped cuts 13 at the top portions of the pins 14. At the center of the stationary mold 12 a sprue 16 is provided through which melted plastics material A is injected. The said pins 14 are provided so as to support the decorative plate 2 before injection, the fan shaped cuts 13 of the pins 14 hold corners of the decorative plate 2 and when the movable mold 11 is adjoined to the stationary mold 12 the exposing surface of the decorative plate 2 is pushed tightly against the bottom surface a of the movable mold 11 by the spring pins 14 and prevent surplus flow of melted material A on the decorative surface of the decorative plate 2.

Further the pins 14 are pushed back against the coil springs 15 along a guide 18 by the pressure of injected plastics material A in the cavity 10, and the pins 14 stick out again as knock out pins when the halves of the molds are opened.

In order to mold the aforementioned tray with the said mold, a decorative plate 2 is put on the pins 14 which are projecting in the cavity 10, in case of fan shaped cuts 13 are provided on the tops of the pins 14 the corners of the decorative plate 2 are fitted on the said cuts 13. The movable mold 11 is adjoined to the stationary mold 12 to form the cavity 10 and at the same time, the decorative plate 2 is pushed against the bottom surface a of movable mold 11. A small difference of thickness of the decorative plate 2 is allowed because the pins 14 are pushed back when the movable mold 11 is fitted to the stationary mold 12.

By applying the decorative plate 2 as the above, a space 19 in which melted material A is to be injected is formed between the inside edge 4a of the tray body 1 and the periphery 3 of the decorative plate 2.

After these arrangements, melted plastics material A is injected in the cavity 10 through the sprue 16 of the stationary mold 12. In proportion as the pressure in the cavity increases, pins 14 are pushed back into the stationary mold 12 as shown in FIG. 5, and the backside and the periphery 3 of the decorative plate 2 is covered tightly by the injected material. And in case of fan shaped cuts 13 being provided on the pins 14, legs 20 are attached on the backside of the tray 1.

This invention is applicable with several decorative matters and the decorative matters can be fitted so tightly and finely that the method using adhesives can not possibly be attained. The exposing surface of the decorative plate 2 is not contaminated or not spoiled because the said surface is covered by the mold surface of the movable mold 11 when melted material is injected and besides the fitting of the decorative plate 2 is done uniformly along the inside edge of the tray to produce clear and fine finished goods.

Moreover, in the case in which fan shaped cuts 13 are provided on the pins 14 the corners of the decorative plate 2 are held on the said cuts 13 and lateral aberration of the plate 2 can be prevented. As the pins 14 are pushed back by the inside pressure of the cavity, holes resulting from the pins are not formed and the legs 20 are formed by the fan shaped cuts 13 of the pins 14.

Further the structure of the molds of this invention are not complicated and uniform and fine products can be obtained by simple operations as compared with ordinary method.

What I claim is.

1. A process for injection molding a plastic tray having a substantially rigid plate partially encapsulated therein, an area of the front face of said plate defining a corresponding portion of one outer surface of said tray, which process comprises:
    (a) disposing said plate within a mold cavity defined by a pair of stationary and movable mold elements, adjacent a substantially planar masking surface provided on said movable mold element, said surface being substantially coextensive with said plate front face area;
    (b) forcing a plurality of spring-biased supporting pins slidably mounted in said stationary mold element against the periphery of said rigid plate to bias the same against said masking surface and thereby prevent encapsulation of said plate front face area during molding;
    (c) injecting a stream of molten plastic material into the mold cavity from a point disposed opposite from said masking surface to force the molten material directly against an area of the rear face of said plate aligned with the plate front face area;
    (d) filling the mold cavity with the molten plastic material and thereby forcing said supporting pins into the stationary mold element, the plastic material thus injected extending into the recesses left by said pins in the inner surfaces of said mold element to form legs on said tray;
    (e) curing the plastic material in said mold cavity to form the desired plastic tray;
    (f) opening the mold by disengaging the movable mold element from the stationary mold element; and
    (g) ejecting the tray from the mold by forcing said supporting pins against the molded tray legs formed adjacent thereto.

2. An apparatus for the injection molding of a plastic tray having a substantially rigid plate partially encapsulated therein, an area of the front face of said plate defining a corresponding portion of one outer surface of said tray, which apparatus comprises:
    (a) a stationary mold element;
    (b) a movable mold element attached to said stationary mold element and movable with respect to the latter to define an internal mold cavity therebetween defining the configuration of said tray, said movable mold element incorporating a substantially planar internal mold surface defining one wall of the mold cavity and so disposed as to bear against and mask said plate front face area;
    (c) a plurality of spring-biased supporting pins slidably mounted in said stationary mold element and normally extending into the adjacent mold cavity for supporting said plate about its periphery and biasing the same against said internal mold surface to mask the plate and prevent encapsulation of said plate front face area, the stroke of said pins being such that their distance of travel is greater than their fullest extension into said mold cavity;
    (d) means for forcing the spring-biased supporting pins against the molded tray legs formed adjacent thereto to eject the molded tray from the stationary mold element; and
    (e) a sprue provided in said stationary mold element for the injection of molten plastic material, said sprue being disposed opposite from said internal mold surface for injecting the plastic material directly against an area of the rear face of said plate aligned with the plate front face area.

References Cited

UNITED STATES PATENTS

| | | | |
|---|---|---|---|
| 3,044,127 | 7/1962 | Alden | 264—328 |
| 3,122,598 | 2/1964 | Berger | 264—132 X |
| 3,238,287 | 3/1966 | Chapman | 264—278 X |

ROBERT F. WHITE, *Primary Examiner.*

R. B. MOFFITT, J. H. SILBAUGH,
*Assistant Examiners.*